(12) United States Patent
Nakayama et al.

(10) Patent No.: US 8,285,723 B2
(45) Date of Patent: Oct. 9, 2012

(54) SYSTEM AND METHOD FOR INDEXING DOCUMENTS AND RETRIEVING SIMILAR DOCUMENT BASED ON LINK TRANSITION COUNT DISTANCE CALCULATIONS

(75) Inventors: Takehiro Nakayama, Tokyo (JP); Daisuke Torii, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 348 days.

(21) Appl. No.: 12/626,779

(22) Filed: Nov. 27, 2009

(65) Prior Publication Data

US 2010/0138426 A1 Jun. 3, 2010

(30) Foreign Application Priority Data

Dec. 1, 2008 (JP) ................................ P2008-306728

(51) Int. Cl.
*G06F 7/00* (2006.01)
*G06F 17/30* (2006.01)
(52) U.S. Cl. ...................................................... 707/741
(58) Field of Classification Search .................. None
See application file for complete search history.

(56) References Cited

U.S. PATENT DOCUMENTS

| | | | |
|---|---|---|---|
| 6,622,139 B1 | 9/2003 | Nakayama et al. | |
| 7,213,198 B1 * | 5/2007 | Harik | 715/234 |
| 7,809,716 B2 | 10/2010 | Wang et al. | |
| 2005/0165805 A1 * | 7/2005 | Novaes | 707/100 |
| 2009/0265344 A1 | 10/2009 | Etoh et al. | |

FOREIGN PATENT DOCUMENTS

| | | |
|---|---|---|
| CN | 101097574 A | 1/2008 |
| JP | 11-39258 A | 2/1999 |
| JP | 2000-172665 A | 6/2000 |
| JP | 2000-242626 A | 9/2000 |
| JP | 2001-52017 A | 2/2001 |
| JP | 3598738 | 9/2004 |
| JP | 2005-18530 A | 1/2005 |
| JP | 3849318 | 9/2006 |
| JP | 2008-117267 A | 5/2008 |

OTHER PUBLICATIONS

Office Action issued Nov. 2, 2011 in China Application No. 200910246699.9 (With English Translation).

* cited by examiner

*Primary Examiner* — Uyen T Le
(74) *Attorney, Agent, or Firm* — Oblon, Spivak, McClelland, Maier & Neustadt, L.L.P.

(57) ABSTRACT

In an index generating device, a similarity calculating unit calculates access similarities indicating similarities of access histories between documents, based on history information indicating the access histories to the respective documents by users, and a similar document specifying unit specifies a similar document similar to a given document as a retrieval target, based on the access similarities or the like. A retrieval index generating unit generates a retrieval index for the given document as the retrieval target from words appearing in a document set consisting of the similar document and the given document as the retrieval target.

12 Claims, 13 Drawing Sheets

Fig.3

| USER IDENTIFICATION INFORMATION \ DOCUMENT | D1 | D2 | D3 | D4 |
|---|---|---|---|---|
| U001 (TERMINAL P1) | 6 | 0 | 5 | 5 |
| U002 (TERMINAL P2) | 2 | 0 | 2 | 1 |
| U003 (TERMINAL P3) | 4 | 1 | 3 | 2 |

Fig.4

| DOCUMENT / USER IDENTIFICATION INFORMATION | D1 | D2 | D3 | D4 |
|---|---|---|---|---|
| U001 (TERMINAL P1) | 0.80 | 0 | 0.81 | 0.91 |
| U002 (TERMINAL P2) | 0.27 | 0 | 0.32 | 0.18 |
| U003 (TERMINAL P3) | 0.53 | 1.00 | 0.49 | 0.36 |

Fig.5

| TARGET DOCUMENT | SIMILARITY |
|---|---|
| D1,D2 | 0.53 |
| D1,D3 | 0.99 |
| D1,D4 | 0.97 |
| D2,D3 | 0.49 |
| D2,D4 | 0.36 |
| D3,D4 | 0.97 |

*Fig.7*

| TARGET DOCUMENT | LINK COUNT | SIMILARITY | MODIFIED SIMILARITY |
|---|---|---|---|
| D1,D2 | 1 | 0.53 | 0.53 |
| D1,D3 | 1 | 0.99 | 0.99 |
| D1,D4 | 2 | 0.97 | 0.49 |
| D2,D3 | 1 | 0.49 | 0.49 |
| D2,D4 | 2 | 0.36 | 0.18 |
| D3,D4 | 1 | 0.97 | 0.97 |

Fig.9

| NTH ACCESS DOCUMENT / USER IDENTIFICATION INFORMATION | N=1 | N=2 | N=3 | N=4 |
|---|---|---|---|---|
| U001 (TERMINAL P1) | D1 | D3 | D4 | |
| U001 (TERMINAL P1) | D1 | D3 | | |
| U001 (TERMINAL P1) | D1 | D3 | D4 | |
| U002 (TERMINAL P2) | D1 | D3 | D4 | |
| U002 (TERMINAL P2) | D1 | | | |
| U002 (TERMINAL P2) | D1 | D3 | | |
| U003 (TERMINAL P3) | D1 | D2 | D3 | D4 |
| U003 (TERMINAL P3) | D2 | D3 | | |

Fig.10

| TARGET DOCUMENT | SIMILARITY |
|---|---|
| D1→D2 | 0.14 |
| D1→D3 | 0.86 |
| D1→D4 | 0.57 |
| D2→D1 | 0 |
| D2→D3 | 1.0 |
| D2→D4 | 0.5 |

*Fig.11*

| USER IDENTIFICATION INFORMATION \ NTH ACCESS DOCUMENT | N=1 | N=2 | N=3 | N=4 |
|---|---|---|---|---|
| U001 (TERMINAL P1) | D1;5.2sec | D3;2.2sec | D4;3.6sec | |
| U001 (TERMINAL P1) | D1;1.2sec | D3;4.4sec | | |
| U001 (TERMINAL P1) | D1;0.9sec | D3;1.2sec | D4;5.8sec | |
| U002 (TERMINAL P2) | D1;2.2sec | D3;2.2sec | D4;5.2sec | |
| U002 (TERMINAL P2) | D1;5.4sec | | | |
| U002 (TERMINAL P2) | D1;3.6sec | D3;7.0sec | | |
| U003 (TERMINAL P3) | D1;1.2sec | D2;3.2sec | D3;8.2sec | D4;9.6sec |
| U003 (TERMINAL P3) | D2;5.2sec | D3;6.2sec | | |

Fig.12

| TARGET DOCUMENT | SIMILARITY |
|---|---|
| D1→D2 | 0.16 |
| D1→D3 | 1.28 |
| D1→D4 | 1.23 |
| D2→D1 | 0 |
| D2→D3 | 0.98 |
| D3→D4 | 1.88 |

SYSTEM AND METHOD FOR INDEXING DOCUMENTS AND RETRIEVING SIMILAR DOCUMENT BASED ON LINK TRANSITION COUNT DISTANCE CALCULATIONS

BACKGROUND OF THE INVENTION

1. Field of the Invention

The present invention relates to an index generating system, an information retrieval system, and an index generating method.

2. Related Background Art

Presently, there are huge volumes of information stored in the form of documents and others on the Internet (WEB) and users access desired information by a method such as keyword retrieval. The conventional search engines are generally configured to use a relation between a retrieval condition entered by a user and document information, such as word distributions in document groups stored, to extract documents meeting the condition, and to provide the extracted documents in a priority order to the user. Recently, many documents for portable terminals assumed to be browsed from portable terminals such as cell phones and PDAs are being stored on the Internet and there are increasing needs for retrieval of them. In the retrieval of documents for portable terminals, sizes of documents for portable terminals are small and the number of appearing words is small because of restrictions on the screen size and communication capacity. For this reason, there was a problem that direct application of the conventional retrieval methods based on word distributions resulted in a failure in achieving accurate document retrieval in response to a user request.

In contrast to it, the information retrieval method described in Japanese Patent No. 3598738 was to combine a document as a retrieval target with other documents linked thereto and having similar contents, to make a document set, and to extend a retrieval index so as to characterize the document as the retrieval target by words appearing in the document set. Since this information retrieval method used the retrieval index also including words not appearing in the document as the retrieval target, it was expected to enhance the possibility of extraction of documents fitting a retrieval keyword (also called a query word).

SUMMARY OF THE INVENTION

Incidentally, the information retrieval method described in Japanese Patent No. 3598738 was configured to extend the retrieval index by calculating similarities of contents between documents based on distributions of appearing words. Therefore, it was applicable to the general document retrieval on the Internet with relatively large numbers of appearing words, but it was difficult to apply the method directly to retrieval of documents for portable terminals with relatively small numbers of appearing words and small sizes. Specifically, the documents for portable terminals tended to include, for example, words used for user navigation (e.g., "down," "to top of this page," "next page," "return," "click here," etc. indicating a scroll pointer of page and links), names of corporations and groups managing sites, and advertising banners with a high frequency but to include relatively small numbers of words constituting the substance of contents. For this reason, the conventional information retrieval method had a problem that the retrieval index was not appropriately extended for the documents for portable terminals.

The present invention has been accomplished in view of the problem as described above and an object of the present invention is therefore to provide an index generating system, an information retrieval system, and an index generating method enabling accurate estimation of similarities of contents between documents and thereby achieving highly accurate information retrieval.

In order to solve the above problem, the inventors conducted elaborate research and came to turn our attention to the fact that each user to access a certain document had some purpose to access the document (e.g., a document for portable terminals) on the Internet. When this access trend is taken into consideration, we can assume that there is high relevancy between documents accessed within a predetermined time period such as a period of an identical session by each user. Furthermore, if large volumes of document access information can be collected by a service provider of cell phones, the aforementioned access trend can be flattened, so as to further enhance the estimation level of relevancy between documents. Then the inventors discovered that user's access histories could be used to calculate similarities of access histories between documents and the relevancy (similarity degree) of contents between documents could be estimated using the similarities, thereby accomplishing the present invention.

In order to solve the above problem, an index generating system according to the present invention is an index generating system for generating a retrieval index for document retrieval, comprising: an access history storage unit configured to store history information indicating access histories to respective documents by users; a similarity calculating unit configured to calculate access similarities indicating similarities of the access histories between the documents, based on the history information stored in the access history storage unit; a similar document specifying unit configured to specify a similar document similar to a given document as a retrieval target, based on the access similarities; and a retrieval index generating unit configured to generate a retrieval index for the given document as the retrieval target from words appearing in a document set consisting of the given document as the retrieval target and the similar document.

An index generating method according to the present invention is an index generating method for generating a retrieval index for document retrieval, comprising: an access history storage step of storing history information indicating access histories to respective documents by users; a similarity calculating step of calculating access similarities indicating similarities of the access histories between the documents, based on the history information stored in the access history storage step; a similar document specifying step of specifying a similar document similar to a given document as a retrieval target, based on the access similarities; and a retrieval index generating step of generating a retrieval index for the given document as the retrieval target from words appearing in a document set consisting of the given document as the retrieval target and the similar document.

The index generating system and the index generating method described above are configured to calculate the access similarities indicating the similarities of the access histories between the documents, based on the history information indicating the access histories to the respective documents by the users, to specify the similar document similar to the given document as the retrieval target, based on the access similarities, and to generate the retrieval index for the given document as the retrieval target from the words appearing in the document set consisting of the given document as the retrieval target and the similar document. Since the retrieval index is extended to the region including the accurately estimated similar document, highly accurate information retrieval is enabled using the retrieval index generating system and index generating method.

Preferably, the access history storage unit is configured to store as the history information, frequency information wherein access frequencies to the respective documents by the respective users are correlated with identification information of the users, the similarity calculating unit is configured to calculate the access similarities, based on the frequency information stored in the access history storage unit, and the similar document specifying unit is configured to compare the access similarities with a similarity determination threshold to specify the similar document. Since the access frequencies can be relatively readily acquired, this configuration facilitates the specifying of the similar document.

Preferably, the index generating system of the present invention comprises a link distance calculating unit configured to analyze a link structure among documents on a hypertext system in which the documents are interlinked, and to calculate link distances between the documents by link transitions, and the similar document specifying unit is configured to specify as a document group, documents within a link distance not more than a predetermined distance from the given document as the retrieval target, using the link distance calculating unit, and to compare the access similarities between the documents in the document group and the given document as the retrieval target with the similarity determination threshold to specify the similar document. Since the similar document is specified from the semantically-clustered document group, this configuration improves the estimation accuracy of the similarities of contents between the documents.

Preferably, the similarity calculating unit is configured to calculate the access similarities so as to decrease with increase in the link distance calculated by the link distance calculating unit. This configuration permits the specifying of the similar document while reducing influence of a document to impose a greater load of link transitions on the user, and further improves the estimation accuracy of the similarities of contents between the documents.

The access history storage unit may be configured to store as the history information the frequency information including access durations corresponding to the respective access frequencies, and the similarity calculating unit may be configured to calculate the access similarities so as to increase or decrease the access frequencies in the frequency information, based on the access durations. This configuration places a weight on a document browsed for a long period by the user and thus permits the specifying of the similar document suiting actual user action.

Preferably, the access history storage unit is configured to store as the history information, time-series access information wherein access situations to the respective documents by the respective users are correlated with identification information of the users and access times, the similarity calculating unit is configured to calculate the access similarities, based on the access information stored in the access history storage unit, and the similar document specifying unit is configured to compare the access similarities with a similarity determination threshold to specify the similar document. Since it is relatively highly possible that accesses by each user at a predetermined time or the like are carried out to documents with related contents, this configuration permits accurate estimation of the similarities of contents between the documents and thereby achieves the specifying of the similar document.

The access history storage unit may be configured to store as the history information the access information including access durations corresponding to the respective access situations, and the similarity calculating unit may be configured to calculate the access similarities so as to increase or decrease the access situations in the access information, based on the access durations. This configuration places a weight on a document browsed for a long period by the user and thus permits the specifying of the similar document suiting actual user action.

Preferably, the similar document specifying unit has a plurality of similarity determination thresholds and is configured to specify the similar document in a plurality of patterns according to the plurality of similarity determination thresholds, and the retrieval index generating unit is configured to generate retrieval indexes in plural patterns for the given document as the retrieval target from words appearing in each of document sets specified according to the similar documents consisting of the plurality of patterns. This configuration permits control on a retrieval fitting level in execution of the document retrieval and thus enables adjustment for the number of retrieved documents.

In order to solve the above problem, an information retrieval system according to the present invention is preferably an information retrieval system for document retrieval, comprising: an information retrieval unit configured to retrieve a fit document fitting a retrieval query, using the retrieval index generated by the index generating system described above. This information retrieval system enables execution of information retrieval using the accurate retrieval index generated by the aforementioned index generating system.

Preferably, the information retrieval unit is configured to retrieve the fit document fitting the retrieval request, using the retrieval index of one pattern out of the plurality of patterns generated by the index generating system having a plurality of similarity determination thresholds, and to select and use the retrieval index of another pattern out of the plurality of patterns according to a number of fit documents retrieved. This configuration permits adjustment for the number of retrieved documents while controlling the retrieval fitting level by the aforementioned index generating system.

The information retrieval system of the present invention may comprise any one of the following retrieval result reducing units configured to implement reduction in the number of documents if the information retrieval unit retrieves a plurality of documents in an identical site as the fit document: a retrieval result reducing unit configured to perform such reduction as to give a higher priority to a document with a larger similarity to the retrieval request; a retrieval result reducing unit configured to perform such reduction as to give a higher priority to a document with a larger number of words constituting the retrieval index; a retrieval result reducing unit configured to perform such reduction as to give a higher priority to a document with a document path thereof at a higher level out of the plurality of documents; a retrieval result reducing unit configured to perform such reduction as to give a higher priority to a document with a higher document access count, based on the history information stored in the access history storage unit; a retrieval result reducing unit configured to perform such reduction as to give a higher priority to an access start document in each session by the users, based on the history information stored in the access history storage unit. This configuration enables appropriate reduction of the retrieval result.

BRIEF DESCRIPTION OF THE DRAWINGS

FIG. 3 shows an example of history information data stored in the first embodiment.

FIG. 4 shows an example of data resulting from normalization of the history information data shown in FIG. 3.

FIG. 5 shows an example of data indicating access similarities based on the history information data shown in FIG. 3.

FIG. 7 shows an example of data indicating access similarities in the second embodiment.

FIG. 9 shows an example of history information data stored in the third embodiment.

FIG. 10 shows an example of data indicating access similarities based on the history information data shown in FIG. 9.

FIG. 11 shows an example of history information data stored in the fourth embodiment.

FIG. 12 shows an example of data indicating access similarities based on the history information data shown in FIG. 11.

DESCRIPTION OF THE PREFERRED EMBODIMENTS

The preferred embodiments of the index generating system, information retrieval system, and index generating method will be described below in detail with reference to the drawings. In the description of the drawings the same elements will be denoted by the same reference symbols, without redundant description.

First Embodiment

Figure 1:
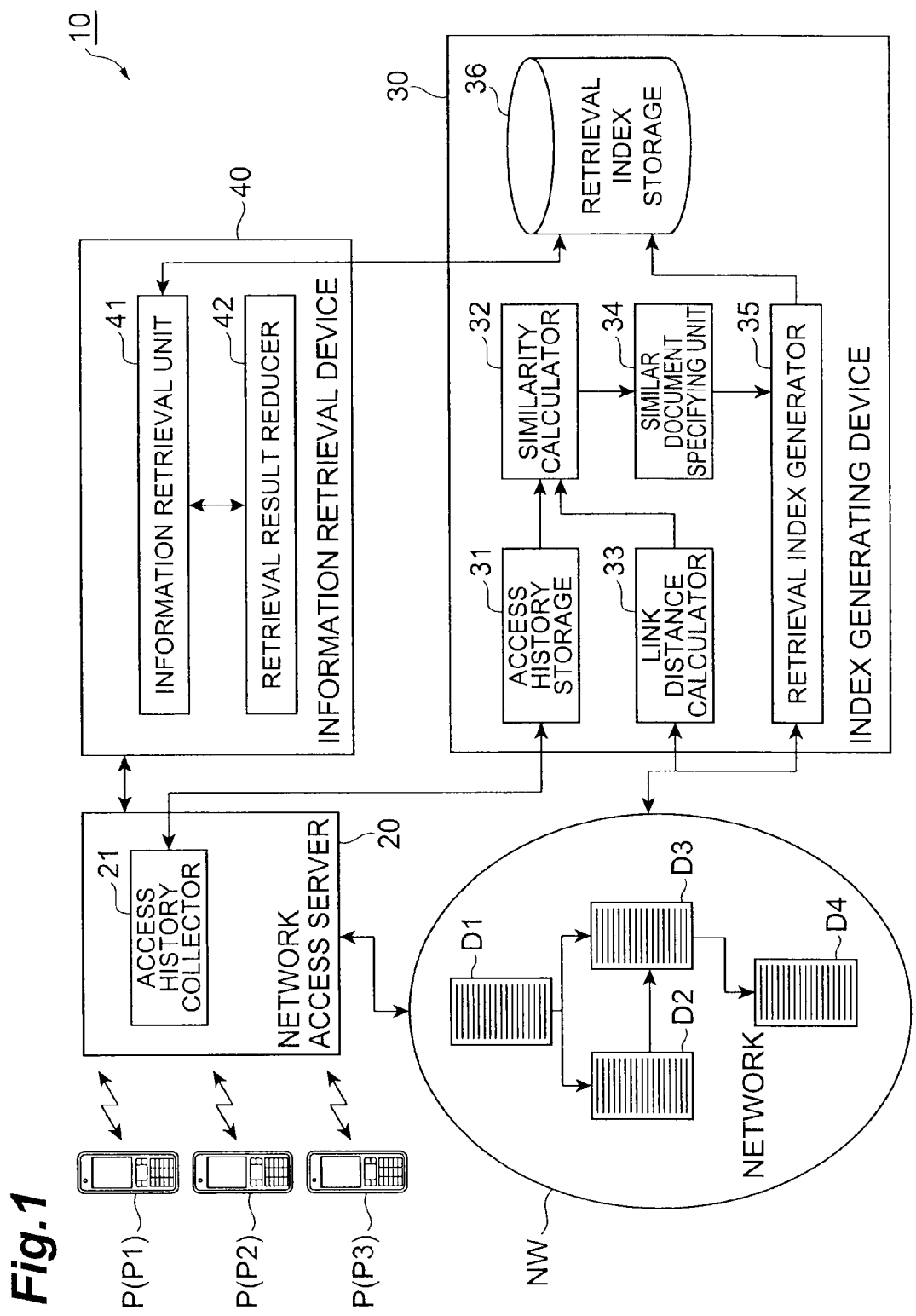
FIG. 1 is a schematic diagram to show a configuration of an information retrieval system according to the first embodiment.

First, an overall configuration of an information retrieval system 10 according to the first embodiment will be described with reference to FIG. 1. As shown in FIG. 1, the information retrieval system 10 is composed of a network access server 20, an index generating device 30, and an information retrieval device 40 and is able to communicate through wired or wireless connections to a network NW such as the Internet in accordance with connection requests from PCs (not shown) or portable terminals P. A portable terminal P is provided with a data communication function for connection to a network, e.g., a WWW browser, in addition to an ordinary call function. When this information retrieval system 10 is used to retrieve information such as documents on the network NW, a user enters a predetermined keyword on the portable terminal P and the portable terminal P outputs a retrieval request based on the keyword through the network access server 20 to the information retrieval device 40. The information retrieval device 40, receiving the retrieval request, executes a retrieval process according to the retrieval request, using the index generating device 30, and returns the retrieval result to the portable terminal P. Then the retrieval result is displayed on a monitor such as a display of the portable terminal P and the user accesses information such as a document selected thereby out of the displayed retrieval result.

The network access server 20 herein is, for example, a gateway or proxy and is configured to receive connection instruction information from respective users entered in the WWW browser or the like of a plurality of portable terminals P (e.g., P1-P3 and others), from the respective portable terminals P and to relay the connection instructions so as to allow the portable terminals P to access the network NW. This network NW constitutes a hypertext system being WWW (World Wide Web) constructed on the Internet and having a configuration wherein documents are interlinked. In the network NW in FIG. 1, as indicated by arrows in the drawing, document D1 links to documents D2 and D3, document D2 to document D3, and document D3 to document D4. The hypertext system of this configuration can be accessed not only from PCs but also from the portable terminals P such as cell phones or PDAs. For convenience' sake of description, the hypertext system shown in FIG. 1 is constructed as WWW consisting of the documents D1-D4 for portable terminals, but the number of documents as objects of the present embodiment does not have to be limited to this example; the objects can be a large number of documents on the Internet, and each document is composed of data of various formats such as an html file, an xml file, a simple text file, a rich text file, and an image.

The network access server 20 is provided with an access history collector 21 which collects history information indicating access histories of respective users, based on connection instructions from the portable terminals P, responses thereto, and so on. The access history collector 21 collects accessed document information on the network NW from the portable terminals P, together with user's identification information. This accessed document information is, for example, URL information. The user's identification information is, for example, a login name upon access to the network, a subscriber identification number of SIM (Subscriber Identity Module) or UIM (User Identity Module), or a terminal identification number such as an IP address or IMEI (International Mobile Equipment Identity). The access history collector 21 can also additionally collect information such as an access time, an access duration, an access document content, or a communication error code, in addition to the above-described information. In FIG. 1, the network access server 20 connects to three portable terminals P1-P3, but a preferred configuration is, for example, such that there are approximately a million portable terminals P, in order to more accurately estimate similarities of contents between documents.

The index generating device 30 is a device that generates a retrieval index for document retrieval from the hypertext system having the configuration wherein documents are interlinked. The index generating device 30 is functionally constructed with an access history storage 31, a similarity calculator 32, a link distance calculator 33, a similar document specifying unit 34, a retrieval index generator 35, and a retrieval index storage 36. This index generating device 30 is bidirectionally connected to the network access server 20, the information retrieval device 40, and the network NW and can exchange information with them.

Figure 2:
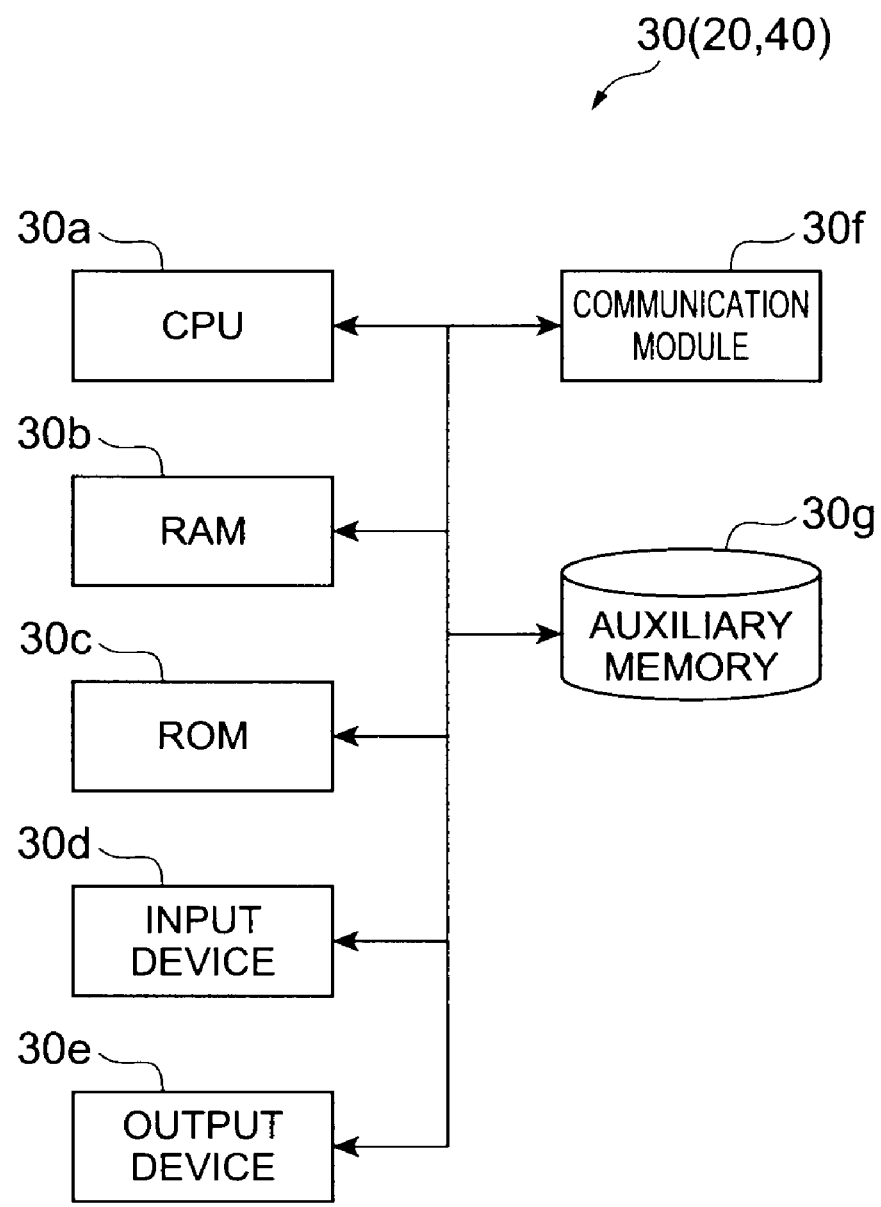
FIG. 2 is a hardware configuration diagram of a retrieval index generating device.

This index generating device 30 is composed of the hardware shown in FIG. 2. FIG. 2 is a hardware configuration diagram of the index generating device 30. The index generating device 30 shown in FIG. 1 is physically configured as a computer system including a CPU 30a, a RAM 30b and a ROM 30c being main memories, an input device 30d, an output device 30e such as a display, a communication module 30*f* being a data transceiving device such as a network card, and an auxiliary memory device 30*g* such as a hard disk drive, as shown in FIG. 2. Each of the functions of the index generating device 30, which will be detailed later, is implemented by reading a predetermined computer software application onto the hardware such as the CPU 30*a* and the RAM 30*b* shown in FIG. 2, thereby operating the input device 30*d*, output device 30*e*, and communication module 30*f* under control of the CPU 30*a*, and reading and writing data from and into the RAM 30*b* and auxiliary memory device 30*g*. The above-described network access server 20 and the below-described information retrieval device 40 also have the same hardware configuration and are configured to be able to execute various functions according to a program.

The access history storage 31 is a part that stores history information indicating access histories to respective documents by users. When the access history storage 31 acquires the various pieces of history information from the access history collector 21, it stores as the history information, frequency information wherein access frequencies by the respective users (or by the respective portable terminals P1-P3) to the respective documents D1-D4 are correlated with the identification information of the users. FIG. 3 shows an example of such stored data and shows access counts (hereinafter sometimes referred to as "access frequencies") to the documents D1-D4 by the respective users (U001-U003). This stored data specifically shows that the user U001 (portable terminal P1) accessed the document D1 six times, the document D2 zero times, the document D3 five times, and the document D4 five times, that the user U002 (portable terminal P2) accessed the document D1 twice, the document D2 zero times, the document D3 twice, and the document D4 once, and that the user U003 (portable terminal P3) accessed the document D1 four times, the document D2 once, the document D3 three times, and the document D4 twice.

The similarity calculator 32 is a part that calculates access similarities indicating similarities of access histories (access trends) between the documents, based on the history information stored in the access history storage 31. The similarity calculator 32 acquires the history information like the frequency information from the access history storage 31 at predetermined time intervals. For calculating the access similarities, the similarity calculator 32 first defines vectors indicating characteristics of the respective documents, using the access counts to the respective documents by the respective users (i.e., defines the access counts by the respective users as components of the vectors) and normalizes the vectors so that the magnitude of each vector becomes 1. For example, let us suppose a case where the history information acquired from the access history storage 31 is the data shown in FIG. 3. For normalizing the data of the document D1 in the user U001, the access counts by the users U001-U003 to the document D1 (six times, twice, and four times) each are squared, the square values are added up, a square root of the sum resulting from the addition, $(6^2+2^2+4^2)^{1/2}$, is defined as a denominator, the access count by the user U001 to the document D1 (six times) is defined as a numerator, and normalized data is acquired as $6/(6^2+2^2+4^2)^{1/2}=0.80$. This normalization calculation is carried out for each of the data and, as shown in FIG. 4, the normalized data of the document D1 in the respective users U001-U003 are obtained as 0.80, 0.27, and 0.53 (one vector). Similarly, the normalized data of the document D2 in the respective users U001-U003 are obtained as 0, 0, and 1.00, the normalized data of the document D3 as 0.81, 0.32, and 0.49, and the normalized data of the document D4 as 0.91, 0.18, and 0.36.

The similarity calculator 32 then calculates inner products between the vectors, based on Formula (1) below. The inner products calculated in this manner are determined to be values indicating access similarities between the documents.

[Math 1]

$$Sim(Dx, Dy) = \sum_{i=1}^{n} x_i \times y_i \qquad (1)$$

For example, when the similarity calculator 32 calculates the inner products between the vectors from the normalized data shown in FIG. 4, based on Formula (1) above, the access similarity between the documents D1 and D2 is calculated as 0.53, the access similarity between the documents D1 and D3 as 0.99, the access similarity between the documents D1 and D4 as 0.97, the access similarity between the documents D2 and D3 as 0.49, the access similarity between the documents D2 and D4 as 0.36, and the access similarity between the documents D3 and D4 as 0.97, as shown in FIG. 5. The similarity calculator 32 outputs the access similarities calculated as described above, to the similar document specifying unit 34.

The link distance calculator 33 is a part that analyzes the link structure among the documents on the hypertext system and calculates link distances between documents by link transitions. The link distance calculator 33 accesses the documents on the hypertext system to analyze the link structure of the documents D1-D4. Then the link distance calculator 33 calculates link distances being the shortest outreaches between the documents D1-D4 (minimum link transition counts). The link distances may be calculated by determining the outreaches by breadth first search of links by the same method as the WWW crawler, or by individually analyzing links of the respective documents D1-D4 by sequential search of path information (URL Information) recorded in the aforementioned history information. This analysis obtains, for example, the document D2 and the document D3 as documents reached with the link distance or link transition count of 1 from the document D1 on the hypertext system shown in FIG. 1, and the document D4 reached with the link transition count of 2.

The similar document specifying unit 34 is a part that specifies a similar document similar to a given document as a retrieval target, based on the above-described access similarities or the like. When the similar document specifying unit 34 is given a certain document as a retrieval target (which will be referred to as "retrieval target document"), it first specifies as a document group, documents reachable by link transitions not more than a predetermined link distance threshold (or a plurality of link distance thresholds) from the retrieval target document, using the calculation result of link distances by the link distance calculator 33. The similar document specifying unit 34 extracts each of the access similarities between the retrieval target document and the documents in the document group from the access similarities input from the similarity calculator 32 and compares each extracted access similarity with a similarity determination threshold TH for estimation of similarity between contents of two documents. Then the similar document specifying unit 34, performing the comparison, specifies a document with an access similarity larger than the similarity determination threshold TH, as a similar document a content of which is similar to the retrieval target document.

For example, in a case where the retrieval target document is the document D1 and where the link distance threshold is 2, the similar document specifying unit 34 first specifies as a document group the documents D2, D3, and D4 whose link distance is not more than 2. If the similarity determination threshold TH is 0.9, the similar document specifying unit 34 excludes the document D2 with the access similarity of 0.53 from the document group and specifies as similar documents the document D3 with the access similarity of 0.99 and the document D4 with the access similarity of 0.97. In another case where the retrieval target document is the document D1 and where the link distance threshold is 1, the similar document specifying unit 34 specifies the documents D2 and D3 as a document group and if the similarity determination threshold TH is 0.9, the similar document specifying unit 34 excludes the document D2 and specifies the document D3 as a similar document. The similar document specifying unit 34 outputs the information about the retrieval target document and the specified similar document to the retrieval index generator 35.

The retrieval index generator 35 is a part that generates a retrieval index for the retrieval target document from a distribution of words appearing in a document set consisting of the retrieval target document and its similar document. When the retrieval index generator 35 receives the information of the similar document and others from the similar document specifying unit 34, it accesses the network NW to acquire information associated with the document contents and generates a retrieval index for the retrieval target document from terms appearing in the document set specified according to the similar document. In generation of the retrieval index as described above, the retrieval index may be modified so as to include the conjugations, derivatives, and/or spelling variations of appearing words. Furthermore, the retrieval index generator 35 may generate the retrieval index so as to reflect a weight by markup with a tag, or may generate the retrieval index from a distribution of character strings appearing in the documents (e.g., N-GRAM), instead of the distribution of words. There are no particular restrictions on the structure of the retrieval index in the present embodiment, and it can be optionally adopted from the well-known structures such as the inverted index file and B-TREE. The retrieval index generator 35 outputs the retrieval index generated from the document set by one of the various methods described above, to the retrieval index storage 36.

The retrieval index storage 36 is a part that stores the retrieval index for each document (retrieval target document) generated and output by the retrieval index generator 35, in correspondence to each document. The retrieval index storage 36 and the information retrieval device 40 are connected to each other so that the information retrieval device 40 can access the retrieval index. The present embodiment has the configuration wherein the retrieval index storage 36 is located in the index generating device 30, but it is also possible to adopt a configuration wherein the retrieval index storage 36 is located outside the index generating device 30.

When the information retrieval device 40 receives a query (retrieval request) like retrieval keyword information from a portable terminal P of a certain user, it retrieves a document on the network NW fitting the query, and transmits the retrieval result information to the portable terminal P. The information retrieval device 40 is provided with an information retrieval unit 41 and a retrieval result reducer 42.

The information retrieval unit 41 is a part that retrieves a fit document fitting a query, using the retrieval index generated by the index generating device 30. When the information retrieval unit 41 receives a query from a portable terminal P, it accesses the retrieval index storage 36 of the index generating device 30 and retrieves a fit document fitting the query, using the stored retrieval index. For example, when receiving the query, the information retrieval unit 41 extracts keyword information included in the query. Then the information retrieval unit 41 compares the extracted keyword information with various retrieval indexes stored in the retrieval index storage 36 and selects a fit document fitting the query. The information retrieval unit 41 sends to the portable terminal P having sent the retrieval request, information about the fit document acquired as described above (URL information and information of a partial content of the document or the like), as the retrieval result information.

The retrieval result reducer 42 is a part that, if the information retrieval unit 41 retrieves a plurality of documents in an identical site as fit documents, gives a higher priority to a document with a greater similarity to the query. When the information retrieval unit 41 retrieves a plurality of documents in an identical site as the retrieval result, the retrieval result reducer 42 calculates a similarity between the query (e.g., a query consisting of a retrieval keyword of one word or more) and each of the documents in the same site, for example, by the tf-idf method. Then the retrieval result reducer 42 performs a process of selecting a document with the highest similarity out of these documents and discarding the other documents from the retrieval result. Then the retrieval result reducer 42 outputs to the information retrieval unit 41 the retrieval result including only the document with the highest similarity out of the documents in the same site to make the retrieval result transmitted to the portable terminal P having sent the retrieval request. The reduction from the plurality of documents in the same site does not always have to be reduction to one document, but may be reduction to a small number of documents, e.g., two or more documents.

Figure 6:
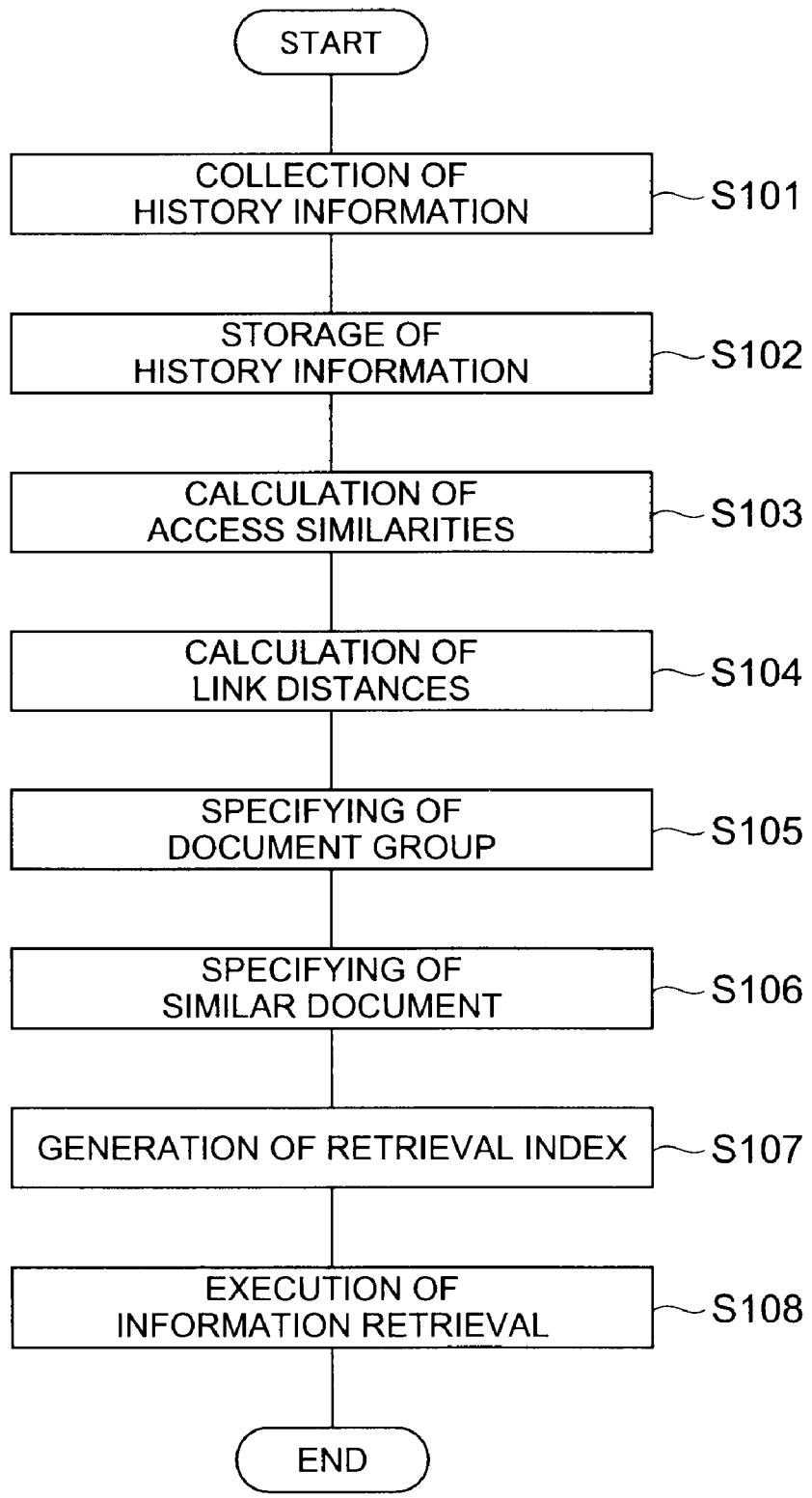
FIG. 6 is a flowchart showing an information retrieval method by the information retrieval system according to the first embodiment.

The below will describe a retrieval method including the index generating method by the above-described information retrieval system 10. FIG. 6 is a flowchart showing the retrieval method by the information retrieval system 10 of the present embodiment. As shown in FIG. 6, the access history collector 21 first collects various types of history information indicating access histories to the documents D1-D4 by the users of the portable terminals P1-P3 (S101). This history information contains accessed document information (URL information, access frequencies, access times, access durations, access document contents, etc.) in correspondence to the user's identification information. Then the access history collector 21 outputs these pieces of history information to the access history storage 31 and the access history storage 31 stores the history information (access history storage step, S102). Specifically, the access history storage 31 stores as the history information, the frequency information wherein the access frequencies by the respective users to the respective documents D1-D4 are correlated with the identification information of the users (cf. FIG. 3).

Next, the similarity calculator 32 calculates the access similarities indicating similarities of access histories between the documents, based on the history information stored in step S102 (S103). For calculating the access similarities, the similarity calculator 32 defines vectors indicating characteristics of the respective documents D1-D4, using the access counts to the respective documents D1-D4 by the respective users, and normalizes the vectors so that the magnitude of each vector becomes 1 (cf. FIG. 4). Then the similarity calculator 32 calculates inner products between the vectors (cf. FIG. 5) and defines the inner products thus calculated, as the access similarities between the documents. The similarity calculator 32 outputs the access similarities calculated as described above, to the similar document specifying unit 34. The link distance calculator 33 analyzes the link structure among the documents on the hypertext system and calculates link distances between documents by link transitions (S104), and it outputs the result to the similar document specifying unit 34.

Thereafter, for a retrieval target document already given at a point of the start of the flowchart of FIG. 6, the similar document specifying unit 34 first specifies as a document group, documents reachable by link transitions not more than the predetermined link distance threshold from the retrieval target document, using the calculation result of link distances by the link distance calculator 33 (S105). Then the similar document specifying unit 34 extracts each of access similarities between the retrieval target document and the documents in the document group, from the access similarities calculated in step S103 and compares each extracted access similarity with the similarity determination threshold TH. Then the similar document specifying unit 34 specifies a document with an access similarity larger than the similarity determination threshold, as a similar document a content of which is similar to the retrieval target document (S106). How to provide the retrieval target document can be a method of defining each of all the documents appearing in the access histories, as a retrieval target document, a method of defining a URL set collected by the conventional WWW crawler, as a retrieval target document, or a combination of these methods.

Thereafter, the retrieval index generator 35 generates a retrieval index for the retrieval target document from a distribution of words appearing in the document set consisting of the retrieval target document and its similar document (S107). The retrieval index generator 35 makes the retrieval index storage 36 store the retrieval index generated in step S107. Then the index generating device 30 repeats the generation of index to generate retrieval indexes of various documents on the network NW. The information retrieval device 40 performs retrieval according to a retrieval request from a portable terminal P, using the retrieval indexes generated as described above, and returns the retrieval result to the portable terminal P (S108).

As described above, the information retrieval system 10 is configured to calculate the access similarities indicating the similarities of access histories between the documents D1-D4, based on the history information indicating the access histories to the respective documents D1-D4 by the users, specify a similar document similar to the retrieval target document, based on the access similarities, and generate the retrieval index for the retrieval target document from words appearing in the document set consisting of the retrieval target document and the similar document. Since the index greater in scale than a retrieval index generated from only the retrieval target document can be generated using the information of a document or documents likely to be accessed simultaneously with the retrieval target document by users in practice as described above, the present embodiment can prevent a retrieval omission. Namely, since the retrieval index is extended to the region including the similar document accurately estimated, highly accurate information retrieval can be performed using the retrieval index generating system and index generating method. Each of the functions such as the above-described index generating device 30, information retrieval device 40, and others does not have to be arranged in each individual device, but may be located anywhere on the system. In that case, the index generating system or the like is composed of these functions. The same also applies to the embodiments below.

The access history storage 31 stores as the history information the frequency information wherein the access frequencies by the respective users to the respective documents are correlated with the user's identification information, the similarity calculator 32 calculates the access similarities, based on the frequency information stored in the access history storage 31, and the similar document specifying unit 34 compares the access similarities with the similarity determination threshold TH and specifies as a similar document a document with an access similarity larger than the similarity determination threshold TH. The access frequencies can be relatively readily acquired and the determination is made using the similarity determination threshold TH; therefore, this configuration facilitates the specifying of the similar document.

The information retrieval system 10 has the link distance calculator 33 which analyzes the link structure among the documents D1-D4 on the hypertext system with the configuration wherein the documents D1-D4 are interlinked, and which calculates the link distances between the documents D1-D4 by link transitions, and the similar document specifying unit 34 specifies as a document group documents within a link distance not more than the predetermined distance from the retrieval target document, using the link distance calculator 33, and compares the access similarities between the retrieval target document and the documents in the document group with the similarity determination threshold TH to specify a similar document. Since this configuration permits the similar document to be specified from the semantically-clustered document group, estimation accuracy is improved for the similarities of contents between documents.

Second Embodiment

The following will describe the information retrieval system 10 according to the second embodiment of the present invention. The present embodiment is configured so that the similarity calculator 32 in the first embodiment is replaced by a similarity calculator 32a which calculates an access similarity so as to decrease with increase in a link distance calculated by the link distance calculator 33. The other configuration is the same as in the first embodiment.

The similarity calculator 32a calculates the inner products between vectors indicating characteristics of the respective documents D1-D4, in the calculation of access similarities based on the history information, which is the same as the similarity calculator 32 in the first embodiment. The similarity calculator 32a further multiplies each of the inner products by 1/N (where N is a link transition count necessary for movement between documents) to obtain an access similarity (cf. "modified similarity" in FIG. 7). For example, the first embodiment was the example wherein the document D3 and the document D4 were specified as similar documents to the document D1 in the case where the link distance threshold was 2 and the similarity determination threshold TH was 0.9, whereas the present embodiment is an example wherein the document D4 is excluded with the modified similarity of 0.49 and only the document D3 is specified as a similar document. Namely, the link transition count necessary for movement between documents is given as a kind of penalty, whereby influence of a document requiring greater cost by transitions (user's link clicks) is excluded from the generation of retrieval index. It is noted that the access similarities may be calculated by multiplying the inner products by 1/logN or $1/N^2$, instead of 1/N described above.

Third Embodiment

Figure 8:
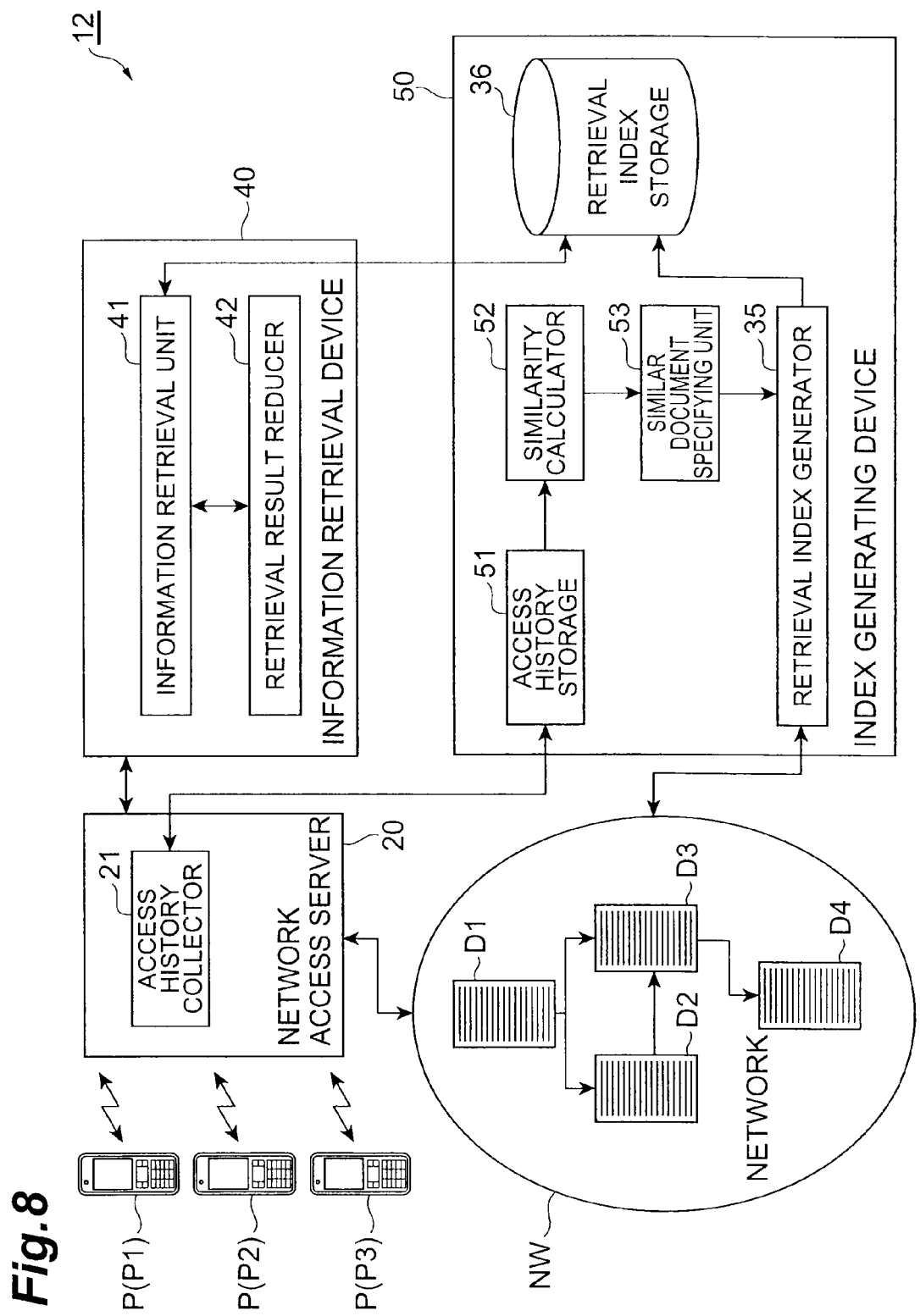
FIG. 8 is a schematic diagram to show a configuration of an information retrieval system according to the third embodiment.

The following will describe an overall configuration of an information retrieval system 12 according to the third embodiment of the present invention. The present embodiment is configured, as shown in FIG. 8, so that the access history storage 31 to the similar document specifying unit 34 in the first embodiment are replaced by an access history storage 51, a similarity calculator 52, and a similar document specifying unit 53. The basic functions of the access history storage 51, similarity calculator 52, and similar document specifying unit 53 are the same as those of the access history storage 31, similarity calculator 32, and similar document specifying unit 34 in the first embodiment. The present embodiment will be described below with focus on the difference from the first embodiment.

The access history storage 51 is a part that stores the history information indicating the access histories to the respective documents by the users. When the access history storage 51 acquires various types of history information from the access history collector 21, it stores as the history information, time-series access information wherein access situations (the presence/absence of access) by the respective users to the respective documents D1-D4 are correlated with the user's identification information and access times. Specifically, the history information stored is access information per session in which document accesses in an identical site are arranged in an access order. The access information per session is determined based on the access times or the like, and a session is determined to finish if there is no document access time in a predetermined period of time (e.g., 30 minutes). The access information per session does not always have to be limited to accesses in an identical site, but may be determined so that accesses in different sites occurring within a predetermined period of time are classified in the same session.

FIG. 9 shows an example of stored data of access information per session as described above. According to this stored data, the user U001 performed three sessions, the first session to access documents in an order of document D1→document D3→document D4, the second session to access documents in an order of document D1→document D3, and the third session to access documents in an order of document D1→document D3→document D4. Similarly, the user U002 performed three sessions, the first session to access documents in an order of document D1→document D3→document D4, the second session to access the document D1, and the third session to access documents in an order of document D1→document D3. Furthermore, the user U003 performed two sessions, the first session to access documents in an order of document D1→document D2→document D3→document D4 and the second session to access documents in an order of document D2→document D3.

The similarity calculator 52 is a part that calculates access similarities indicating similarities of access histories between documents, based on the history information stored in the access history storage 51. The similarity calculator 52 calculates, for each of documents, a probability of access to another document after access to a certain document in the same session, based on Formula (2) below. Formula (2) below is, for example, a formula to calculate an access similarity between the document D1 and the document D2 and is one taking account of an access order. For calculating an access similarity between other documents, the "documents" in Formula (2) are replaced by documents for calculation of the access similarity.

[Math 2]

$$Sim'(\text{document } D1 \rightarrow \text{document } D2) = (\text{number of accesses to document } D2 \text{ after document } D1) / (\text{access count to document } D1) \quad (2)$$

The similarity calculator 52 calculates the access similarities between the documents D1-D4, for example, from the access information as shown in FIG. 9, based on the calculation Formula (2) above. FIG. 10 shows the access similarities between the documents calculated as described above; specifically, the access similarity from D1 to D2 is 0.14, the access similarity from D1 to D3 0.86, the access similarity from D1 to D4 0.57, the access similarity from D2 to D1 0, the access similarity from D2 to D3 1.0, and the access similarity from D2 to D4 0.5. The similarity calculator 52 outputs the access similarities calculated in this manner, to the similar document specifying unit 53. When the similarity calculator 52 calculates the access similarities, it may calculate the access similarities using the access counts in identical sessions, without taking account of the access orders.

The similar document specifying unit 53 is a part that specifies a similar document similar to a given document as a retrieval target, based on the aforementioned access similarities. When the similar document specifying unit 53 is given a retrieval target document, it compares each similarity with the similarity determination threshold TH for estimation of similarity of contents between the retrieval target document and the other documents, using the access similarities fed from the similarity calculator 52. Then the similar document specifying unit 53 specifies a document with an access similarity larger than the similarity determination threshold TH, as a similar document a content of which is similar to the retrieval target document.

For example, in a case where the retrieval target document is the document D1 and the similarity determination threshold is 0.3, the similar document specifying unit 53 excludes the document D2 with the access similarity of 0.14 and specifies the document D3 with the access similarity of 0.86 and the document D4 with the access similarity of 0.57 as similar documents. The similar document specifying unit 53 outputs information about the retrieval target document and the specified similar documents to the retrieval index generator 35 and the retrieval index generator 35 generates the retrieval index, based on the input similar documents and others.

An information retrieval method including the index generating method by the information retrieval system 12 as described above is much the same as the information retrieval method in the first embodiment, except that the access information per session arranged in the access order is used as the history information. Namely, the information retrieval method by the information retrieval system 12 according to the present embodiment is different in that in step S102 of the first embodiment the access history storage 51 stores as the history information the access information per session arranged in the access order, in step S103 the similarity calculator 52 calculates the access similarities as described above, based on the access information, and in step S106 the similar document specifying unit 53 specifies a similar document similar to the retrieval target document, based on the access similarities thus calculated. The retrieval method of the present embodiment does not include steps corresponding to steps S104 and S105 to calculate the link distances in the first embodiment.

In the information retrieval system 12, as described above, the access history storage 51 stores as the history information the time-series access information per session wherein access situations by the respective users to the respective documents are correlated with the user's identification information and access times, the similarity calculator 52 calculates the access similarities, based on the access information stored in the access history storage 51, and the similar document specifying unit 53 compares the access similarities with the similarity determination threshold TH and specifies a document with an access similarity larger than the similarity determination threshold TH, as a similar document. Since it is relatively highly possible that accesses by each user at a predetermined time or the like are carried out to documents with related contents, the foregoing configuration is able to specify a similar document, based on accurate estimation of similarities of contents between documents. Since the determination is made using the similarity determination threshold TH, it is easy to specify a similar document. Furthermore, the present embodiment allows omission of the link analysis between documents and thus achieves increase in processing speed and reduction in time and effort to set the link distance threshold or the like.

Fourth Embodiment

The following will describe the information retrieval system 12 according to the fourth embodiment of the present invention. The present embodiment is configured so that the access history storage 51 to the similar document specifying unit 53 in the third embodiment are replaced by an access history storage 51a, a similarity calculator 52a, and a similar document specifying unit 53a. The basic functions of the access history storage 51a to the similar document specifying unit 53a are the same as those of the access history storage 51 to the similar document specifying unit 53 in the third embodiment. The present embodiment will be described below with focus on the difference from the third embodiment.

The access history storage 51 of the third embodiment stores the history information (cf. FIG. 9) based on the access situations (the presence/absence of access) per session, whereas the access history storage 51a is a part that stores history information per session of access situations including access residence durations in the respective documents. For example, the access history storage 51a stores the history information as shown in FIG. 11: the user U001 performed three sessions, the first session to access documents in an order of document D1 (5.2 sec)→document D3 (2.2 sec)→document D4 (3.6 sec), the second session to access documents in an order of document D1 (1.2 sec)→document D3 (4.4 sec), and the third session to access documents in an order of document D1 (0.9 sec)→document D3 (1.2 sec)→document D4 (5.8 sec). Similarly, the user U002 performed three sessions, the first session to access documents in an order of document D1 (2.2 sec)→document D3 (2.2 sec)→document D4 (5.2 sec), the second session to access document D1 (5.4 sec), and the third session to access documents in an order of document D1 (3.6 sec)→document D3 (7.0 sec). The user U003 performed two sessions, the first session to access documents in an order of document D1 (1.2 sec)→document D2 (3.2 sec)→document D3 (8.2 sec)→document D4 (9.6 sec) and the second session to access documents in an order of document D2 (5.2 sec)→document D3 (6.2 sec).

The similarity calculator 52a is a part that calculates access similarities indicating similarities of access histories between documents, based on the history information including the access residence durations, which is stored in the access history storage 51a. The similarity calculator 52a calculates, for each individual document, a residence duration in access to another document after access to a certain document in an identical session, based on Formula (3) below. Formula (3) below is, for example, a formula to calculate an access similarity between the document D1 and the document D2 and is one taking account of an access order. For calculating an access similarity between other documents, the "documents" in Formula (3) are replaced by documents for calculation thereof.

[Math 3]

$$Sim''(\text{document } D1 \rightarrow \text{document } D2) = (\text{total of access residence durations in document } D2 \text{ in accesses to document } D2 \text{ after document } D1)/(\text{total of access residence durations in document } D1) \quad (3)$$

The similarity calculator 52a calculates the access similarities between the documents D1-D4, for example, from the access information as shown in FIG. 11, based on Formula (3) above. FIG. 12 shows the access similarities between documents calculated as described above; specifically, the access similarity from D1 to D2 is 0.16, the access similarity from D1 to D3 1.28, the access similarity from D1 to D4 1.23, the access similarity from D2 to D1 0, the access similarity from D2 to D3 0.98, and the access similarity from D2 to D4 1.88. The similarity calculator 52a outputs the access similarities calculated as described above, to the similar document specifying unit 53a. Based on the access similarities calculated based on the residence durations as described above, the similar document specifying unit 53a specifies a similar document in the same manner as the similar document specifying unit 53 does. The access similarities may be calculated using the access residence durations in identical sessions, without taking account of the access orders.

As described above, the information retrieval system 12 is configured to adjust (increase or decrease) the access situations in the access information, based on the user's access durations in the respective documents. This configuration permits a larger weight to be given to a document browsed for a longer period by the user, and is thus able to specify a similar document according to actual user action. The information retrieval system 10 of the first embodiment may also be modified with taking account of the access durations as described above so that the access frequencies are adjusted based on the access durations by the users to the respective documents.

Fifth Embodiment

The following will describe the information retrieval system 10 according to the fifth embodiment of the present invention. The present embodiment is configured so that the similar document specifying unit 34 and the retrieval index generator 35 in the first embodiment are replaced by a similar document specifying unit 34a and a retrieval index generator 35a. The basic functions of the similar document specifying unit 34a and the retrieval index generator 35a are the same as those of the similar document specifying unit 34 and the retrieval index generator 35. The present embodiment will be described below with focus on the difference from the first embodiment.

The similar document specifying unit 34a is a part that specifies a document similar to a given document as a retrieval target, based on access similarities or the like. This similar document specifying unit 34a has a plurality of similarity determination thresholds TH used in specifying of a similar document. Namely, the similar document specifying unit 34a has a plurality of similarity determination thresholds (TH1, TH2, ..., THn) and specifies similar documents (SD1, SD2, ..., SDn) in a plurality of patterns corresponding to the respective similarity determination thresholds. The similar document specifying unit 34a outputs information about the similar documents in the plurality of patterns or the like specified in this manner, to the retrieval index generator 35a.

The retrieval index generator 35a is a part that generates retrieval indexes in a plurality of patterns for a retrieval target document from a distribution of words appearing in each of document sets consisting of the retrieval target document and the similar documents in the plurality of patterns. When the retrieval index generator 35a receives information of the similar documents (SD1, SD2, ..., SDn) in the plurality of patterns and others from the similar document specifying unit 34a, it generates retrieval indexes (ID1, ID2, ..., IDn) in a plurality of patterns for the retrieval target document from words appearing in each of document sets specified according to the similar documents. The number of keywords appearing in the retrieval index tends to increase with increase in the number of documents included in the similar documents. Namely, a possibility of fitting a query as a retrieval request can be increased with increase in the number of documents included in the similar documents. The retrieval index generator 35a outputs the retrieval indexes in the plural patterns thus generated, to the retrieval index storage 36 to make it store the retrieval indexes.

Figure 13:
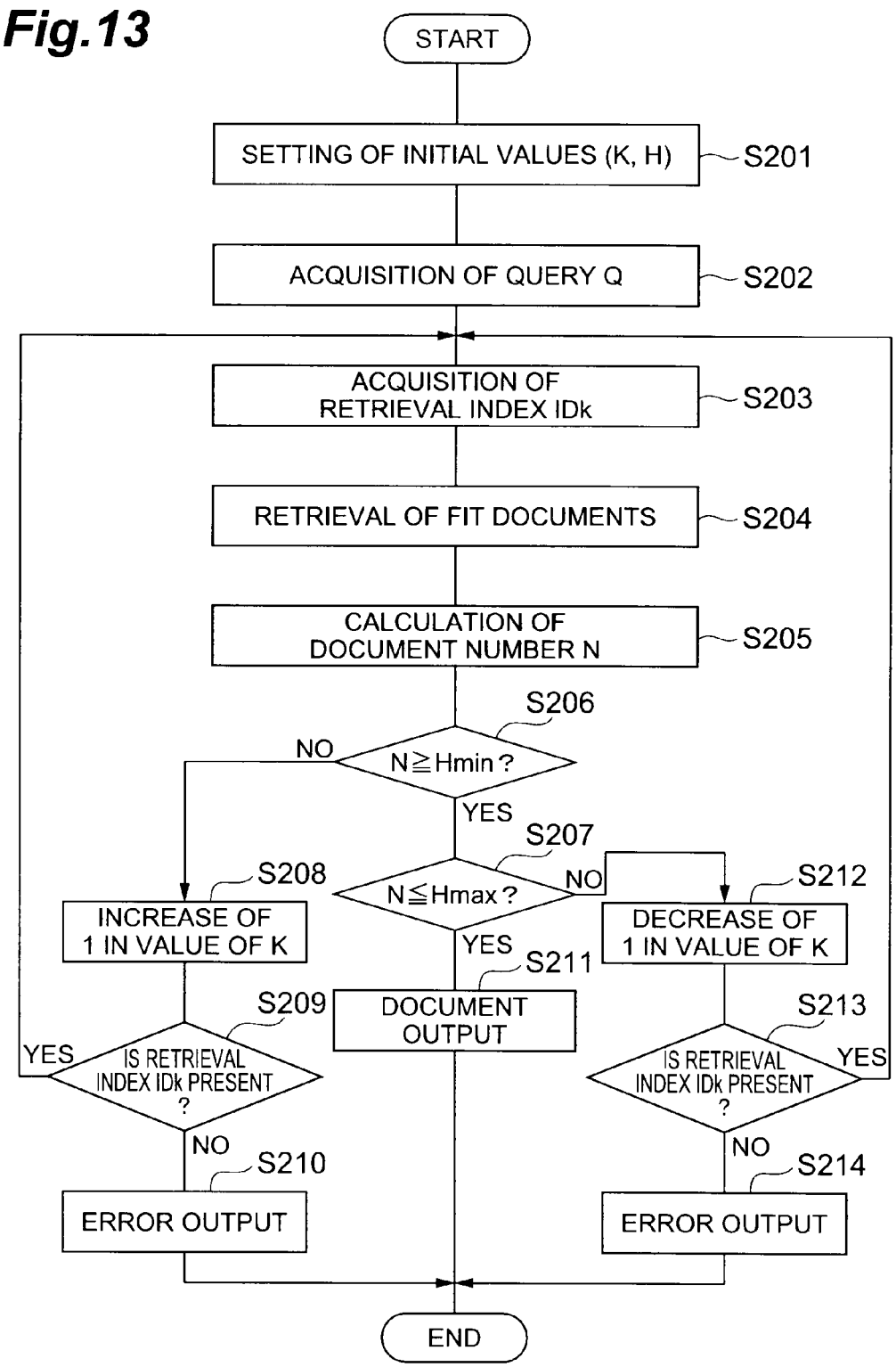
FIG. 13 is a flowchart showing an information retrieval method by the information retrieval system according to the fifth embodiment.

The below will describe an information retrieval method by the information retrieval device 40 using the retrieval index storage 36 storing the retrieval indexes in the plural patterns for a given retrieval target document as described above, with reference to FIG. 13.

First, the information retrieval device 40 sets as initial values, a value K indicating a certain retrieval index out of the retrieval indexes in the plural patterns, a minimum number Hmin of fit documents, and a maximum number Hmax of fit documents (S201). The value K used herein has such a relation that the number of keywords included in the retrieval index for the retrieval target document increases with increase in the value (i.e., as the value K increases, the number of fit documents fitting the query Q being a retrieval request increases).

Thereafter, the information retrieval device 40 receives and acquires the query Q from the portable terminal P (S202). This query Q is, for example, a retrieval keyword consisting of a word or two or more words, and is entered on the portable terminal P by the user of the portable terminal P. With input of the query Q, the information retrieval device 40 acquires a retrieval index IDk set as an initial value, from the retrieval index storage 36 (S203). Then it retrieves fit documents fitting the query Q, using the retrieval index IDk (S204). This retrieval is implemented by a conventional retrieval method. After the retrieval in step S204, the number N of fit documents is calculated (S205).

After the calculation of the number N of fit documents, the information retrieval device 40 then compares the document number N with the minimum document number Hmin of fit documents set as an initial value (S206). If the document number N is not less than the minimum document number Hmin, the flow proceeds to step S207. On the other hand, if the document number N is smaller than the minimum document number Hmin, the information retrieval device 40 increases the value K by one (S208) and determines whether the retrieval index IDk corresponding to the increased value K is present in the retrieval index storage 36 (S209). When the retrieval index IDk is present, the flow returns to step S203 to repeat the retrieval of fit documents; if the retrieval index IDk is absent, the flow proceeds to step S210 to output an error and terminate the processing.

On the other hand, step S207 is to compare the document number N with the maximum document number Hmax of fit documents set as an initial value. If the document number N is not more than the maximum document number Hmax, the flow goes to step S211 to output the fit documents. When the fit documents are output, they may be output in order of their similarities to the query Q. Then the information retrieval device 40 transmits the output result to the portable terminal P having sent the retrieval request. If the document number N exceeds the maximum document number Hmax, the information retrieval device 40 decreases the value K by one (S212) and determines whether the retrieval index IDk corresponding to the decreased value K is present in the retrieval index storage 36 (S213). If the retrieval index IDk is present, the flow returns to step S203 to repeat the retrieval of fit documents; if the retrieval index IDk is absent, the flow goes to step S214 to output an error and terminate the processing. The error output is also transmitted to the portable terminal P having sent the retrieval request. The error output indicates a failure in the retrieval of documents by the number in the defined range.

In the information retrieval system 10, as described above, the similar document specifying unit 34a has a plurality of similarity determination thresholds and specifies the similar documents in plural patterns according to the plurality of similarity determination thresholds, and the retrieval index generator 35a generates the retrieval indexes in plural patterns for a retrieval target document from words appearing in each of document sets specified according to similar documents consisting of a plurality of patterns. Then the information retrieval device 40 performs the feedback control using the retrieval indexes in the plural patterns generated in this manner, to control the number of retrieved documents, which can solve problems that the number of retrieved documents is so large as to make reduction hard and that the number of retrieved documents is so small as to cause a failure in finding a desired document. It is also possible to adopt a configuration wherein the user is allowed to set the aforementioned value K, minimum document number Hmin, and maximum document number Hmax through the use of the portable terminal P. For example, when the user desires to reduce the number of documents retrieved, the user can decrease the maximum document number Hmax.

The below will describe modification examples of the first embodiment to the fifth embodiment. In each of the above embodiments there was no particular temporal limit to obtain the history information in storing the various pieces of history information in the access history storage 31, 51, or the like, but the above-described various processes may be carried out by obtaining the history information from access histories about accesses within a recent time period T (e.g., 24 hours). When this time limit is set, a newly disclosed document with a small access count (cumulative number) can be compensated for disadvantageous part due to the new disclosure. It is also possible to adopt a configuration wherein a plurality of such time periods T are prepared and the access history storage 31, 51, or the like holds multiple pieces of history information. In this case, the similarity calculator 32, 52, or the like selects appropriate history information from the multiple pieces of history information, thereby compensating for the disadvantageous part of access similarity for the newly disclosed document. Furthermore, it can also be contemplated that the recent time period T is divided, a ratio of access frequencies is calculated for each divided period, and the frequency information to be stored in the access history storage 31 or the like is corrected (e.g., intentionally increased) for a document with a large ratio (one whose access count is rapidly increasing).

In the aforementioned first embodiment and others, the retrieval result reducer 42 reduced the number of documents by giving a higher priority to a document with a larger similarity to a retrieval request by the tf-idf method, but the reduction may be arranged in such a manner that the similarity to the retrieval request is calculated for each of documents in the document set used in generation of the retrieval index and a document with the highest similarity is selected. Furthermore, the reduction may be so arranged that the number of documents constituting the document set used in generation of the retrieval index is calculated and one with the largest number of constitutive documents is selected. The reduction may also be modified so as to calculate the number of words or predetermined keywords appearing in the document set used in the generation of the retrieval index and select one with the largest word number or keyword number. The reduction may also be so arranged as to calculate the number of words (keywords) constituting the retrieval index and select one with the largest word number or keyword number.

Furthermore, the reduction may also be carried out so as to obtain a path (URL) of a logical directory where each server (WWW server) for document delivery is located, and to select one with this path at a higher level. The reduction may also be carried out so as to calculate the access counts to the documents with reference to the access history storage 31, 51, or the like, and to select one with the maximum calculated count. The reduction may also be performed to calculate frequencies of documents to appear at the beginning of each access session from the users (access start documents), with reference to the access history storage 31, 51, or the like, and to select one with the largest frequency. Furthermore, the reduction may also be performed so as to calculate a frequency of occurrences of each document appearing at the first to the Mth positions in each access session from the users, with reference to the access history storage 31, 51, or the like, and to select one with the largest frequency. In this case, the system may be configured to preliminarily define scores to reduce in order from the first to the Mth and accumulate scores, instead of the simple calculation of frequencies. In this case, the reduction is performed so as to select one with the largest score.

The present invention was specifically described above based on the embodiments thereof, but the present invention is by no means intended to be limited to the above embodiments. For example, the retrieval index was generated based on the accesses from the portable terminals P, but the retrieval index may also be generated based on accesses from computers such as PCs. It is a matter of course that the present invention is applicable to retrieval from computers such as PCs. It can also be contemplated that when the similarity calculator 32, 52, or the like calculates the similarities between documents, it calculates the similarities while discriminating whether an access to a document is a recent one, or it calculates the similarities, based on access increase tendencies to documents. This configuration can solve a problem that a newly created document with a small access count is less likely to be reflected in the generation of the retrieval index.

The access history storage 31, 51, or the like was located in the index generating device 30, 50, or the like, but it may be located at another place, for example, in the network access server 20. Furthermore, the information retrieval device 40 was configured to be connected via the network access server 20 to the portable terminal P, but it may be configured to be connected via another server different from the network access server 20 to the portable terminal P. Furthermore, each of the functional parts of the index generating device 30, 50 and each of the functional parts of the information retrieval device 40 can be located anywhere in the information retrieval system 10, 12 and the devices do not always have to be separated. The functional parts may be located in separate devices. Namely, it is sufficient that the functional parts exist as the information retrieval system or the index generating system.

What is claimed is:

1. An index generating system for generating a retrieval index for document retrieval, comprising:
    a memory that stores history information indicating access histories to respective documents by users, the history information including frequency information wherein access frequencies to the respective documents by the respective users are correlated with identification information of the users; and
    a processor that
        calculates access similarities indicating similarities of the access histories between the documents, based on the frequency information stored in the memory;
        analyzes a link structure among documents on a hypertext system in which the documents are interlinked and calculates a link transition count distance between the documents by counting a number of link transitions between the documents;
        specifies a similar document similar to a given document as a retrieval target by comparing the access similarities with a similarity determination threshold to specify the similar document, and specifies, as a document group, documents within a link transition count distance not more than a predetermined distance from the given document as the retrieval target and compares the access similarities between the documents in the document group and the given document as the retrieval target with the similarity determination threshold to specify the similar document; and
        generates a retrieval index for the given document as the retrieval target from words appearing in a document set consisting of the given document as the retrieval target and the similar document.

2. The index generating system according to claim 1,
    wherein the processor calculates the access similarities so as to decrease with increase in the link distance transition count calculated by the processor.

3. The index generating system according to claim 1,
    wherein the memory stores as the history information the frequency information including access durations corresponding to the respective access frequencies, and
    wherein the processor calculates the access similarities so as to increase or decrease the access frequencies in the frequency information, based on the access durations.

4. The index generating system according to claim 1,
    wherein the memory stores as the history information, time-series access information wherein access situations to the respective documents by the respective users are correlated with identification information of the users and access times,
    wherein the processor calculates the access similarities, based on the access information stored in the memory, and
    wherein the processor compares the access similarities with a similarity determination threshold to specify the similar document.

5. The index generating system according to claim 4,
    wherein the memory stores as the history information the access information including access durations corresponding to the respective access situations, and
    wherein the processor calculates the access similarities so as to increase or decrease the access situations in the access information, based on the access durations.

6. An information retrieval system for document retrieval, comprising:
   an interface that retrieves a fit document fitting a retrieval request, using the retrieval index generated by the index generating system defined in claim 1.

7. The information retrieval system according to claim 6, further comprising:
   a second processor configured so that if the interface retrieves a plurality of documents in an identical site as the fit document the second processor performs such reduction as to give a higher priority to a document with a larger similarity to the retrieval request.

8. The information retrieval system according to claim 6, further comprising:
   a second processor configured so that if the interface retrieves a plurality of documents in an identical site as the fit document the second processor performs such reduction as to give a higher priority to a document with a larger number of words constituting the retrieval index.

9. The information retrieval system according to claim 6, further comprising:
   a second processor configured so that if the interface retrieves a plurality of documents in an identical site as the fit document the second processor performs such reduction as to give a higher priority to a document with a document path thereof at a higher level out of the plurality of documents.

10. The information retrieval system according to claim 6, further comprising:
    a second processor configured so that if the interface retrieves a plurality of documents in an identical site as the fit document the second processor performs such reduction as to give a higher priority to a document with a higher document access count, based on the history information stored in the memory.

11. The information retrieval system according to claim 6, further comprising:
    a second processor configured so that if the interface retrieves a plurality of documents in an identical site as the fit document the second processor performs such reduction as to give a higher priority to an access start document in each session by the users, based on the history information stored in the memory.

12. An index generating method for generating a retrieval index for document retrieval, comprising:
    storing, in a memory, history information indicating access histories to respective documents by users, the history information including frequency information wherein access frequencies to the respective documents by the respective users are correlated with identification information of the users;
    calculating, by a processor, access similarities indicating similarities of the access histories between the documents, based on the frequency information stored in the memory
    analyzing, by the processor, a link structure among documents on a hypertext system in which the documents are interlinked and calculating a link transition count distance between the documents by counting a number of link transitions between the documents;
    specifying, by the processor, a similar document similar to a given document as a retrieval target by comparing the access similarities with a similarity determination threshold to specify the similar document, and specifying, as a document group, documents within a link transition count distance not more than a predetermined distance from the given document as the retrieval target and comparing the access similarities between the documents in the document group and the given document as the retrieval target with the similarity determination threshold to specify the similar document; and
    generating, by the processor, a retrieval index for the given document as the retrieval target from words appearing in a document set consisting of the given document as the retrieval target and the similar document.

* * * * *